United States Patent [19]

Leifer

[11] 3,976,584

[45] Aug. 24, 1976

[54] THERMAL ENERGY STORAGE MATERIAL

[75] Inventor: Leslie Leifer, Hancock, Mich.

[73] Assignee: Board of Control of Michigan Technological University, Houghton, Mich.

[22] Filed: May 18, 1973

[21] Appl. No.: 361,834

[52] U.S. Cl. ............................. 252/77; 165/104 M; 252/67; 252/70; 252/78.1; 252/78.5
[51] Int. Cl.² ......................................... C09K 5/06
[58] Field of Search ................... 252/77, 78, 67, 70, 252/71

[56] References Cited

UNITED STATES PATENTS

| | | | |
|---|---|---|---|
| 3,255,607 | 6/1966 | Bair et al. ............................ | 62/530 |
| 3,834,456 | 9/1974 | Clarke ................................... | 252/67 |

OTHER PUBLICATIONS

Chem. Abstracts 77:66827w.
Chem. Abstracts 80:7609r.
Bhatnagar, V. M. *Clathrate Compounds* Chemical Publishing Co., Inc. New York 1970 p. 16.
Bailar, Jr., J. C. *The Chemistry of Coordination Compounds*, Reinhold Publishing Corp. New York 1956 pp. 561–562.
Chem. Abstracts vol. 76, 1972 p. 221 No. 28331b.
Hagan, Sr. Martinette *Clathrate Inclusion Compounds* Reinhold Publishing Corp. New York 1962.

*Primary Examiner*—Benjamin R. Padgett
*Assistant Examiner*—Deborah L. Kyle

[57] ABSTRACT

A thermal energy storage material which is stable at atmospheric temperature and pressure and has a melting point higher than 32°F. is prepared by dissolving a specific class of clathrate forming compounds, such as tetra n-propyl or tetra n-butyl ammonium fluoride, in water to form a substantially solid clathrate. The resultant thermal energy storage material is capable of absorbing heat from or releasing heat to a given region as it transforms between solid and liquid states in response to temperature changes in the region above and below its melting point.

16 Claims, No Drawings

THERMAL ENERGY STORAGE MATERIAL

BACKGROUND OF THE INVENTION

This invention relates to thermal energy storage materials and, more particularly, to thermal energy storage materials capable of storing and releasing thermal energy and a method for using the same for temperature control.

Because of the normal fluctuations of ambient temperatures between a 24-hour period, electrical power and/or fuel required by thermal conditioning systems to maintain a substantially constant thermal environment also fluctuates. Consequently, there are periods of peak demands and substantially reduced demands by such thermal conditioning systems. For instance, the electrical power demanded by an air conditioning system used to cool a building, home, etc., during the summer months reaches a peak during the hot, mid-day hours and can be negligible during cool evening and night hours. In large metropolitan areas, the power demands by air conditioning systems can reach levels which overburden the electrical distribution system to the point of causing so-called "brown out" conditions. Similarly, temperature fluctuations during the cooler winter months result in peak fuel demands by heating equipment during cool night time hours and substantially reduced requirements during the warmer day time hours.

Even though the ambient temperature variation during the spring and fall months is much less, some thermal conditioning (either heating or cooling) is required when a relative narrow range between a minimum and maximum temperature is desired for maximum comfort control. In other applications where it is desired to maintain the thermal environment within a relatively small temperature range over extended time periods, such as storage and transporation of certain goods, controlling the environment for temperature-sensitive instruments, etc., it is often necessary to provide auxiliary conditioning equipment.

An object of this invention is to provide a method for reducing the energy demands required by conventional thermal conditioning systems being used to maintain a region within a comfortable temperature range.

Another object of this invention is to provide a thermal energy storage material which is capable of storing and/or releasing thermal energy and can be used to reduce the cooling or heating required to maintain a space within a relatively narrow temperature range.

Other objects, aspects and advantages of the invention will become apparent from the following detailed description and the appended claims.

SUMMARY OF THE INVENTION

According to the invention, a thermal energy storage material is provided comprising a substantially solid clathrate which has a melting point above 32°F. is stable at atmospheric temperature and pressure and has a relatively high specific heat and heat of fusion. The thermal energy storage material is formed by dissolving a clathrate forming compound in water and is characterized by the water being structured in a manner so that the distance between the oxygen atoms thereof is less than 2.87 Angstroms.

The thermal storage material is placed in heat exchange relationship with a region to be thermally conditioned or with the air being introduced into the region. When the temperature of the thermally conditioned region is higher than the melting point of the thermal storage material, such as during the hot hours of the day, heat is absorbed from the region or the air passing over the material. As the thermal storage material absorbs heat, its temperature will eventually rise to its melting point. Because of its high heat of fusion, the thermal storage material can absorb a large quantity of heat per unit mass. When the temperature of the region or the air passing over the thermal storage material is below the melting point of the material, the heat stored during melting is released to the region or air as the material cools to its freezing point, thereby maintaining the temperature of the thermally conditioned region within a relatively narrow range.

By selection of an appropriate solid clathrate or mixtures thereof, a room or similar region can be maintained substantially constant in this manner. The power required for cooling and/or heating heretofore required for comfort control can be substantially reduced and even eliminated in some circumstances depending on the ambient climate condition.

DESCRIPTION OF THE PREFERRED EMBODIMENTS

As used herein, the term "clathrate" means a substantially solid compound formed from water and one or more clathrate forming compounds of a specific class. The resulting clathrate contains a molecule surrounded by water in a manner so that the water exists in a hydrogen bonded cage around the molecule with the oxygen to oxygen distance in the water being less than that for normal water. The distance between the oxygen atoms in normal water is approximately 2.87 Angstroms. Unlike a conventional hydrate, there is no direct bonding between the clathrate forming compound and the water molecules. The water molecules are attached only to each other by hydrogen bonds which are formed by a dipole interaction of electrical dipoles. Thus, the water is structured so that the melting point thereof is above that for normal frozen water. The solid clathrates used in this invention can be formed at and remain stable under ambient temperature and pressure conditions and, hence are distinguishable from conventional clathrates formed from gas hydrate formers which usually must be formed at and maintained under pressure to prevent decomposition.

The clathrate forming compounds used in this invention can be represented by the formula:

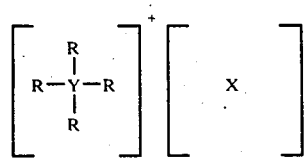

Where each R is selected from the group consisting of alkyl, alkenyl, alkynyl, cycloalkyl, cycloalkenyl and aryl radicals and combinations thereof, such as alkaryl, aralkyl, and the like, containing 1 through 8 carbon atoms; Y is nitrogen, phosphorous, or sulfur; X is chloride, fluoride, or bromide when R contains 1 through 8 carbon atoms, iodide when R contains 1 through 5 carbon atoms, or another anion, such as butyrate.

The representative examples of suitable clathrate forming compounds for use in making the thermal energy storage material of this invention includes tetramethyl, tetraethyl-, tetrapropyl-, tetrabutyl-, tetraamyl-, tetrahexyl-, tetraheptyl-, and tetraoctyl ammonium chlorides, fluorides, and bromides; tetramethyl-, tetraethyl-, tetrapropyl-, tetrabutyl- and tetraamyl ammonium iodides; tetramethyl, tetraethyl-, tetrapropyl-, tetrabutyl-, tetraamyl, tetrahexyl-, tetraheptyl-, and tetraoctyl phosphonium chlorides, fluorides, and bromides; tetramethyl-, tetraethyl, tetrapropyl-, tetrabutyl-, and tetraamyl phosphonium iodides; tetramethyl-, tetraethyl-, tetrapropyl-, tetrabutyl, tetraamyl-, tetrahexyl-, tetraheptyl-, and tetraoctyl sulfonium chlorides, fluorides, and bromides; tetramethyl-, tetraethyl, tetrapropyl-, tetrabutyl-, and tetraamyl sulfonium iodides; and tetramethyl-, tetraethyl-, tetrapropyl-, tetrabutyl, tetraamyl-, tetrahexyl-, tetraheptyl-, and tetraoctyl ammonium butyrates.

The clathrate forming compounds presently preferred are represented by the formula $R_4'NX$ where $R'$ is a straight chain alkyl radical containing 1 through 4 carbon atoms or combinations thereof and X is fluoride, chloride, or bromide. When dissolved in water this particular class of clathrate forming compounds has been found to have a particularly good ability to form the desired substantially solid clathrate. Within this specific class, tetra n-butyl ammonium fluoride is the most preferred.

To form the thermal energy storage material this invention, one or more of the above starting materials is dissolved in water to form a substantially solid clathrate. This dissolution is preferably carried out at substantially atmospheric temperature and pressure; however, higher temperatures and pressures can be used if desired to increase the rate of dissolution and, hence, the rate of solid clathrate formation.

The resulting clathrate has a melting point higher than 32°F., which of course varies depending upon the specific clathrate forming compound used. For example, tetra n-butyl ammonium fluoride forms a clathrate, $(C_4H_9)_4NF \cdot 32.8\ H_2O$, which has a melting point of about 77°F., tetra n-butyl ammonium chloride forms a clathrate, $(C_4H_9)_4NCl \cdot 33\ H_2O$, which has a melting point of about 50°F., and tetra n-butyl ammonium butyrate forms a clathrate which has a melting point of about 59°F.

The clathrate is then separated from the solution in any suitable manner. For instance, if the solution temperature is above the melting point of the clathrate formed, the solution is cooled to a temperature below the melting point of the clathrate but above 32°F. causing the clathrate to precipitate. The excess water is then removed, such as by decantation and/or evaporation.

The resultant clathrates used as the thermal energy storage material of this invention have latent heats of fusion and specific heats approaching that of water and have melting points higher than 32°F. As mentioned above, the oxygen to oxygen distance of the water in the hydrogen bonded cage of the clathrate is less than that for normal water. For example, the 0—0 distance for the clathrate, $(n-C_4H_9)_4NF \cdot 32.8\ H_2O$ formed from n-tetra butyl ammonium fluoride is 2.67 Angstroms. The thermal energy storage material, much like water, is capable of absorbing or storing reasonably large quantities of heat upon "melting" or changing in phase from a solid to a liquid state and then releasing this absorbed or stored heat upon "freezing" or changing in phase from a liquid to a solid state.

In accordance with the invention, a thermal energy storage material having a melting point generally corresponding to the temperature desired for the region to be thermally conditioned is used. The thermal energy storage material is positioned in relation to the region to be thermally controlled or in relation to the air to be circulated through the region so that the material can absorb heat from and/or release heat to the region or the air as it transforms between liquid and solid states. Of course, the type and amount of thermal energy storage material used depends upon the temperature desired for the region being thermally conditioned, the size of the region, the ambient temperature, etc.

The thermal energy storage material is preferably placed in a sealed container made from a thermally conductive material. The material of the container should be arranged to provide a large surface-to-volume ratio of the storage material in heat transfer relationship with the region or the air being thermally conditioned so as to facilitate heat transfer therebetween. Various container arrangements and materials can be used, such as thin-walled, plate-shaped, plastic containers.

The thermal energy storage material can be used in any applications where its heat or cold absorption and/or heat or cold release capability can be advantageously used to thermally condition a region within a relatively narrow temperature range. For example, containers of the thermal energy storage material can be packed into the walls, ceiling, and/or floors of a room in a home, office building, or the like. As the temperature inside the room starts to increase above the melting point of the thermal energy storage material, such as during the warm day time hours, the material slowly absorbs heat from the room and continues to absorb heat until it becomes completely "melted". As the temperature inside the room decreases below the melting point of the material, such as during the cooler night time hours, the material releases heat to the room and continues to release heat until it becomes completely "frozen" or solidified. Also, some quantity of heat can be absorbed by the material after melting and released by the material after becoming solidified. Thus, if sufficient heat exchange material is provided to absorb the excess heat during the warm hours, the temperature inside the room will be maintained at a substantially constant temperature generally corresponding to the melting point of the thermal energy storage material.

The thermal energy storage material can be used in conjunction with an air conditioning system to reduce power requirements during periods of peak demand. For instance, containers of the thermal energy storage material can be positioned in an air conditioning system used for cooling a region so that the cooling air passes in heat exchange relationship therewith. The air conditioning system can be arranged so that during the off-peak night hours when the system is not normally cooling, cooled air is flowed in contact with and freezes the thermal energy storage material, thus storing cooling capacity. During the hot day time hours, when the air conditioning system is cooling, the thermal energy storage material, as it slowly melts, absorbs heat from and cools the air passing through the system. By evening the thermal energy storage material has melted and the cycle is repeated. Thus, the cooling provided by the thermal energy storage material effectively reduces the power required by the air refrigeration equipment to provide cooling during the high temperature hours.

A reverse scheme can be used with a heating system, i.e., the system is arranged so that the thermal energy storage material absorbs heat from heated air flowing in contact therewith during warmer day time hours when the system is not normally heating and releases heat to air flowing in contact therewith during cooler evening hours when the system is heating. The heating provided by the thermal energy storage material thereby reduces the power required by the heating equipment to provide heating during the cooler temperature hours.

The thermal energy storage material can be used to preserve perishable goods during shipment or storage to thereby reduce or eliminate the refrigeration required. For example, containers of the thermal energy storage material having a melting point generally corresponding to the desired temperature can be packed in cartons containing the goods or used to insulate the storage or transportation compartment containing the goods. After being cooled to a temperature below its melting point, the thermal energy storage material will remain at its melting point temperature until sufficient heat has been absorbed to change it from a solid to a liquid state, thereby maintaining the temperature of the goods at that temperature for some time.

The following examples are presented to illustrate this invention and are not to be construed as limitations thereto.

EXAMPLE 1

Clathrate forming compounds suitable for producing the thermal energy storage material of this invention can be prepared from the corresponding bromide salt in the following manner:

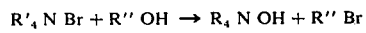

1.

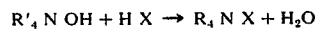

2.

Where R' corresponds to the R' groups defined above, R'' OH is an anion exchange resin, such as Dowex 1-X8, and X is a halide or an anion as defined above. For example, tetrabutyl ammonium fluoride can be prepared by starting with tetrabutyl ammonium bromide in reaction (1) with hydrofluoric acid being added in reaction (2). Tetrabutyl ammonium buytrate can be prepared in the same manner except that butyric acid is added in reaction (2) and tetrabutyl ammonium chloride can be prepared in the same manner except that hydrochloric acid is added in reaction (2).

EXAMPLE 2

Tests were performed to evaluate the effectiveness of a thermal energy storage material of this invention. A chamber simulating the interior of a dwelling was constructed from 2 inch thick Styrofoam. The interior dimensions of the chamber were 18 in. by 20 in. by 18 in. high. A tray adapted to hold a thermal energy storage material of this invention was positioned in the top of the chamber to provide the ceiling of the simulated dwelling. The chamber was heated with an electrical heater located inside the chamber. The output of the heater was set at 5 watts to provide a constant heat input rate generally simulating the typical heat input into a dwelling during a summer day.

In a control test the tray was empty. In another test approximately 1 lb. of a clathrate $(n-C_4H_9)_4 NF.32.8 H_2O$, formed from tetra n-butyl ammonium fluoride and having a melting point of about 77°F., was placed in the tray. In both tests, the average temperature of the air in the chamber was measured at various time intervals with thermocouples located in top and bottom portions of the chamber. The results of these tests are listed in Table II below:

Table II

| | Average Temperature of Air in Chamber, °F. | |
|---|---|---|
| Time, hours | Control | With Thermal Energy Storage Material |
| 0 | 76.5°F. | 77.0°F. |
| 0.6 hrs. | 80.0 | 78.0 |
| 1.3 | 81.5 | — |
| 2.4 | 84.0 | 80.0 |
| 3.2 | 85.5 | 80.5 |
| 4.0 | — | 80.7 |
| 4.8 | — | 81.0 |
| 5.6 | — | 81.0 |
| 6.4 | — | 81.0 |
| 7.0 | 89.5 | — |
| 7.2 | — | 81.2 |
| 8.0 | — | 81.2 |
| 8.5 | 90.5 | 81.2 |
| 8.8 | — | 81.2 |
| 9.6 | — | 81.5 |
| 10.4 | — | 82.0 |
| 11.2 | — | 82.2 |
| 12.1 | — | 82.7 |
| 12.9 | — | 82.8 |
| 13.6 | — | 83.0 |
| 14.4 | — | 83.0 |
| 15.2 | — | 83.0 |
| 16.7 | — | 83.8 |
| 17.6 | — | 84.4 |
| 18.4 | — | 85.0 |
| 19.2 | — | 85.8 |

From these test results, it can be seen that the average temperature of the chamber air increased from 76.5°F. to 84°F. in a little over 2 hours when no thermal energy storage material was used, whereas the average temperature of the chamber air remained below 84°F. for over 16 hours (with the same heat input) when a thermal energy storage material of the invention was used. It also can be seen that, when a thermal energy storage material of this invention was used, the average temperature of the air in the chamber after 8.5 hours was more than 9°F. cooler, no heat exchange material was used.

Although the preferred embodiments of this invention have been described in detail, it will be apparent to those skilled in the art that various changes and modifications can be made thereto without departing from the spirit and scope of the invention.

I claim:

1. A thermal energy storage device for thermally conditioning a region comprising a sealed container made from a thin wall, thermally conductive material, having a large surface-to-volume ratio and containing as a thermal energy storage material a substantially solid clathrate which has a melting point above 32° F, has a latent heat of fusion approaching that of water, does not decompose at ambient temperature and pressure and is characterized by the 0—0 distance of water in the hydrogen bonded cage being less than about 2.87 Angstroms, said clathrate being formed by combining with water a clathrate forming compound having the formula

where each R is selected from the group consisting of alkyl, alkenyl, alkynyl, cycloalkyl, cycloalkenyl and aryl radicals, and combinations thereof containing 1 through 8 carbon atoms; Y is nitrogen, phosphorous, or sulfur; and X is chloride, fluoride, or bromide when R contains 1 through 8 carbon atoms, is iodide when R contains 1 through 5 carbon atoms, or is butyrate, whereby, when said thermal energy storage device is placed in heat transfer relationship with the region, said clathrate absorbs heat from the region, while changing from a solid to liquid state, when the temperature of the region is above the melting point of said clathrate, and/or said clathrate releases heat to and thereby heats the region, while changing from a liquid to solid state, when the temperature of the region is below the melting point of said clathrate.

2. The thermal energy storage device according to claim 1 wherein said clathrate forming compound has the formula $R_4' N X$ 

where each $R'$ is a straight chain alkyl radical containing 1 through 4 carbon atoms and X is fluoride, chloride, bromide, or butyrate.

3. The thermal energy storage device according to claim 2 wherein said clathrate forming compound is tetra n-butyl ammonium fluoride.

4. The thermal energy storage device according to claim 3 wherein said clathrate has the formula $(C_4H_9)_4 NF . 32.8 H_2O$.

5. The thermal energy storage device according to claim 2 wherein said clathrate forming compound is tetra n-butyl ammonium chloride.

6. The thermal energy storage device according to claim 5 wherein said clathrate has the formula $(C_4H_9)_4 NCl . 33 H_2O$.

7. The thermal energy storage device according to claim 2 wherein said clathrate forming compound is tetra n-butyl ammonium butyrate.

8. A method for thermally conditioning a region comprising placing a thermal energy storage material having a predetermined melting point above 32° F in heat exchange relationship with said region so that, when the temperature of said region is above said predetermined melting point, said thermal energy storage material, while changing from a solid to a liquid state, absorbs heat from said region and/or, when the temperature of said region is below said predetermined melting point, said thermal energy storage material, while changing from a liquid to a solid state, releases heat to said region, said thermal energy storage material comprising a substantially solid clathrate which is stable at ambient temperature and pressure and is formed by combining with water a clathrate forming compound having the formula

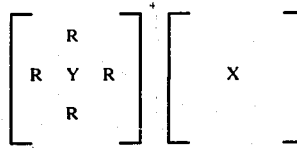

where each R is selected from the group consisting of alkyl, alkenyl, alkynyl, cycloalkyl, cycloalkenyl and aryl radicals and combinations thereof, containing 1 through 8 carbon atoms; Y is nitrogen, phosphorous, or sulfur; X is chloride, fluoride, or bromide when R contains 1 through 8 carbon atoms, is iodide when R contains 1 through 5 carbon atoms or is butyrate.

9. The method according to claim 8 wherein said region is defined by wall means and said heat exchange material is positioned adjacent to said wall means.

10. The method according to claim 8 wherein said clathrate forming compound has the formula $R_4' N X$ 

where each $R'$ is a straight chain alkyl radical containing 1 through 4 carbon atoms and X is fluoride, chloride, bromide, or butyrate.

11. The method according to claim 10 wherein said clathrate forming compound is tetra n-butyl ammonium fluoride.

12. The method according to claim 11 wherein said clathrate has the formula $(C_4H_9)_4 NF . 32.8 H_2O$.

13. The method according to claim 10 wherein said clathrate forming compound is tetra n-butyl ammonium chloride.

14. The method according to claim 13 wherein said clathrate has the formula $(C_4H_9)_4 NCl . 33 H_2O$.

15. The method according to claim 10 wherein said clathrate forming compound is tetra n-butyl ammonium butyrate.

16. The method according to claim 8 wherein said region is thermally conditioned by air flowing from an air conditioning system and said thermal energy storage material is located in the air conditioning system so that the conditioning air flows in heat transfer relationship therewith and said thermal energy storage material releases heat to and/or absorbs heat from the conditioning air when the temperature of the conditioning air is respectively below and above the melting point of said thermal energy storage material.

* * * * *